(12) United States Patent
Kishio et al.

(10) Patent No.: US 10,550,787 B2
(45) Date of Patent: Feb. 4, 2020

(54) GAS ENGINE

(71) Applicant: Yanmar Co., Ltd., Osaka-shi, Osaka-fu (JP)

(72) Inventors: Kazuma Kishio, Osaka (JP); Hiroyuki Otsubo, Osaka (JP); Yoshinori Mizukami, Osaka (JP)

(73) Assignee: YANMAR CO., LTD., Osaka (JP)

( * ) Notice: Subject to any disclaimer, the term of this patent is extended or adjusted under 35 U.S.C. 154(b) by 53 days.

(21) Appl. No.: 15/573,671

(22) PCT Filed: May 13, 2016

(86) PCT No.: PCT/JP2016/064341
§ 371 (c)(1),
(2) Date: Nov. 13, 2017

(87) PCT Pub. No.: WO2016/182071
PCT Pub. Date: Nov. 17, 2016

(65) Prior Publication Data
US 2018/0119630 A1    May 3, 2018

(30) Foreign Application Priority Data
May 14, 2015 (JP) .................. 2015-098829

(51) Int. Cl.
*F02D 41/00* (2006.01)
*F02D 41/14* (2006.01)
(Continued)

(52) U.S. Cl.
CPC ........... *F02D 41/1454* (2013.01); *F01N 3/10* (2013.01); *F02D 19/021* (2013.01); *F02D 41/1439* (2013.01); *F02M 21/0236* (2013.01)

(58) Field of Classification Search
CPC ............ F02D 41/1454; F02D 41/1439; F02D 41/0027; F02D 41/2454; F02D 41/1408;
(Continued)

(56) References Cited

U.S. PATENT DOCUMENTS 4,174,690 A  11/1979 Sumiyoshi
4,437,340 A  3/1984 Csere et al.
(Continued)

FOREIGN PATENT DOCUMENTS

CA       2915083 A1  12/2014
CN     102913308 A    2/2013
(Continued)

OTHER PUBLICATIONS

International Search Report dated Jun. 28, 2016 issued in corresponding PCT Application PCT/US2016/064341.
(Continued)

*Primary Examiner* — Hieu T Vo
*Assistant Examiner* — Sherman D Manley
(74) *Attorney, Agent, or Firm* — Norton Rose Fulbright US LLP

(57) ABSTRACT

This disclosure includes engines that are capable of controlling an air-fuel ratio responsive to rapid changes in the calorific value of a fuel gas. Some engines include an A/F valve, a solenoid valve, and a control unit configured to close the A/F valve when an average opening degree of the solenoid valve is lower than a preset target opening degree, and open the A/F valve when the average opening degree is equal to or higher than the target opening degree. In some engines, when the opening degree of the solenoid valve has been an upper limit opening degree or a lower limit opening degree of the solenoid valve over a predetermined number of times, the control unit is configured to compare with the upper or lower limit opening degree, in lieu of the average
(Continued)

opening degree, against the target opening degree to open or close the A/F valve.

12 Claims, 8 Drawing Sheets

(51) Int. Cl.
*F01N 3/10* (2006.01)
*F02D 19/02* (2006.01)
*F02M 21/02* (2006.01)

(58) Field of Classification Search
CPC .... F02D 19/021; F02D 19/029; F02D 19/023; F02M 21/0236; F02M 21/02; F01N 3/10; Y02T 10/32
See application file for complete search history.

(56) References Cited

U.S. PATENT DOCUMENTS

| | | | | |
|---|---|---|---|---|
| 4,761,948 A | * | 8/1988 | Sood | F02C 9/40 60/39.281 |
| 4,833,878 A | * | 5/1989 | Sood | F02C 9/40 60/39.463 |
| 2004/0011050 A1 | * | 1/2004 | Inoue | F02C 3/22 60/773 |
| 2004/0089279 A1 | * | 5/2004 | McLaughlin | F02D 41/0027 123/688 |
| 2010/0126170 A1 | * | 5/2010 | Nishio | F02M 21/047 60/611 |
| 2015/0233313 A1 | * | 8/2015 | Fimml | F02D 19/084 123/435 |
| 2016/0123266 A1 | * | 5/2016 | Otsubo | F02D 41/30 123/445 |

FOREIGN PATENT DOCUMENTS

| | | |
|---|---|---|
| CN | 103184955 A | 7/2013 |
| EP | 3009645 A1 | 4/2016 |
| JP | S61-255229 A | 11/1986 |
| JP | H01-113565 A | 5/1989 |
| JP | 2014-199031 A | 10/2014 |
| JP | 2014-240616 A | 12/2014 |

OTHER PUBLICATIONS

Australian Examination Report No. 1 dated Sep. 28, 2018 issued in corresponding Australian Application No. 2016261807.
Search Report dated Apr. 17, 2018 for EP Application No. 16792795.3.
Chinese Office Action dated Mar. 21, 2019 issued in corresponding CN Application No. 201680016869.2.

* cited by examiner

GAS ENGINE

CROSS REFERENCES TO RELATED APPLICATIONS

This application is a national stage application pursuant to 35 U.S.C. § 371 of International Application No. PCT/JP2016/064341, filed on May 13, 2016, which claims priority under 35 U.S.C. § 119 to Japanese Patent Application No. 2015-098829, filed on May 14, 2015, the disclosures of which are hereby incorporated by reference in their entireties.

TECHNICAL FIELD

The present invention relates to a gas engine capable of responding to a change in the calorific value of a fuel gas.

BACKGROUND ART

In general, a control of the air-fuel ratio in a gas engine is set corresponding to a fuel gas having a fixed composition, but actually, a composition of a supplied fuel gas is not fixed.

In a conventionally disclosed configuration, an A/F valve and a solenoid valve are arranged in a fuel path, and a control is performed such that the average opening degree of the solenoid valve is settled to 50%, to perform stoichiometric combustion in a gas engine fueled by a gas having a variable calorific value (for example, see Patent Literature 1 (PTL 1)).

CITATION LIST

Patent Literature

PTL 1: Japanese Patent Application Laid-Open No. 2014-240616

SUMMARY OF INVENTION

Technical Problem

In the conventional gas engine described above, however, the average value of a predetermined number of median values each obtained based on maximum and minimum values is adopted as the average opening degree of the solenoid valve, and therefore a risk may arise that if the calorific value of a fuel gas rapidly changes, the solenoid valve reaches an upper limit opening degree or a lower limit opening degree and remains in that state, so that the maximum value and the minimum value are not updated and the average value is fixed, to disable the air-fuel ratio control.

The present invention is made in view of the circumstances described above, and an object of the present invention is to provide a gas engine capable of controlling an air-fuel ratio even in a case where a rapid change in the calorific value of a fuel gas causes fuel supply means to reach an upper limit opening degree or a lower limit opening degree and remain in that state.

Solution to Problem

To solve the problems described above, a gas engine according to an aspect of the present invention is a gas engine including: a first valve and a second valve arranged in a fuel path, the second valve having a longer control period than the first valve does; an exhaust gas purification catalyst arranged in an exhaust path; an air-fuel ratio detection sensor arranged on an entrance side of the exhaust gas purification catalyst; and control means for issuing a drive signal to the first valve and the second valve, the control means being configured to issue to the second valve a drive signal for setting an opening degree to a predetermined opening degree, and issue to the first valve a drive signal for setting an opening degree to a fuel rich side or a fuel lean side based on a detection signal of the air-fuel ratio detection sensor, recognize an opening degree at a time of switching from the fuel rich side to the fuel lean side as a maximal opening degree and an opening degree at a time of switching from the fuel lean side to the fuel rich side as a minimal opening degree, and calculate an average opening degree based on a predetermined number of the maximal opening degrees and a predetermined number of the minimal opening degrees, and when the average opening degree is lower than a target opening degree that is preset based on an engine rotation frequency and output, issue to the second valve a drive signal for closing at a predetermined rate, and when the average opening degree is equal to or higher than the target opening degree, issue a drive signal for opening at a predetermined rate; wherein the control means detects a current opening degree of the first valve, and when the control means determines that the current opening degree keeps being an upper limit opening degree or a lower limit opening degree of the first valve over a predetermined number of times, the control means replaces the average opening degree with the upper limit opening degree or the lower limit opening degree, for comparison against the target opening degree, without calculating the average opening degree based on a predetermined number of the maximal opening degrees and a predetermined number of the minimal opening degrees.

In the above-described gas engine, the control means may adjust an opening degree of the first valve such that an average opening degree is settled to a target opening degree having a width in a case where the average opening degree is not replaced with the upper limit opening degree or the lower limit opening degree.

In the above-described gas engine, the first valve and the second valve may be provided for each cylinder head or for every plurality of cylinder heads.

In the above-described gas engine, a plurality of the first valve and/or the second valve may be provided.

In the above-described gas engine, the control means may set an opening degree of the first valve and an opening degree of the second valve based on an air-fuel ratio measured by an oxygen sensor or an entire region sensor that is arranged in the exhaust path of the gas engine at a location upstream of the catalyst.

Advantageous Effects of Invention

The present invention can control an air-fuel ratio even in a case where a rapid change in the calorific value of a fuel gas causes fuel supply means to reach an upper limit opening degree or a lower limit opening degree and remain in that state.

DESCRIPTION OF EMBODIMENTS

In the following, an embodiment of the present invention will be described with reference to the drawings.

Figure 1:
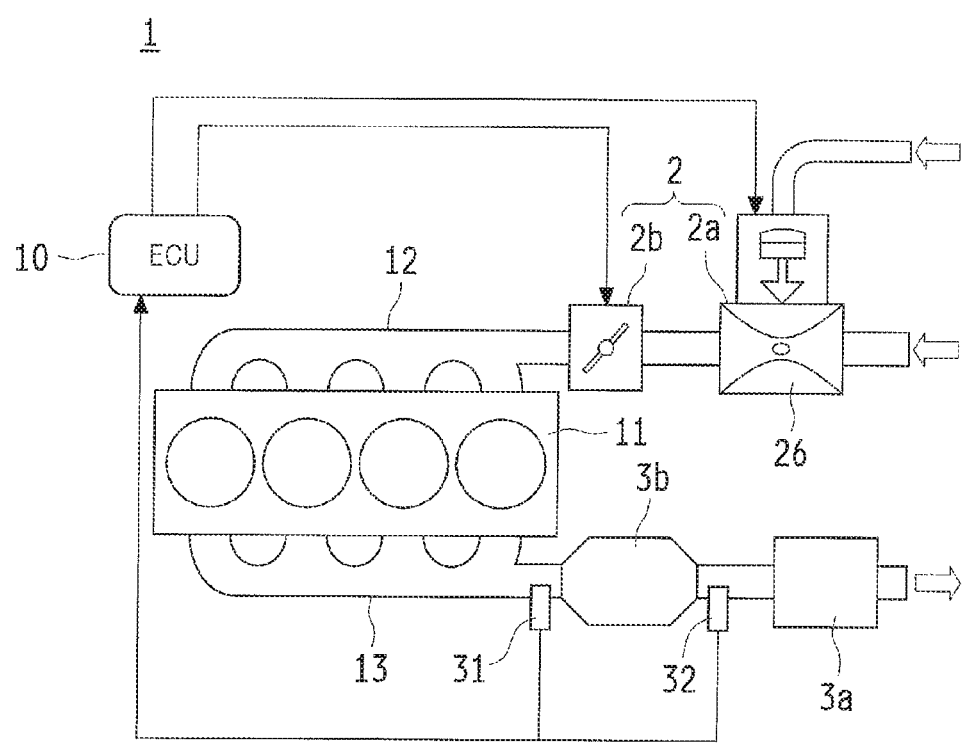
FIG. 1 is a schematic diagram showing an entire configuration of a gas engine according to the present invention.
Figure 2:
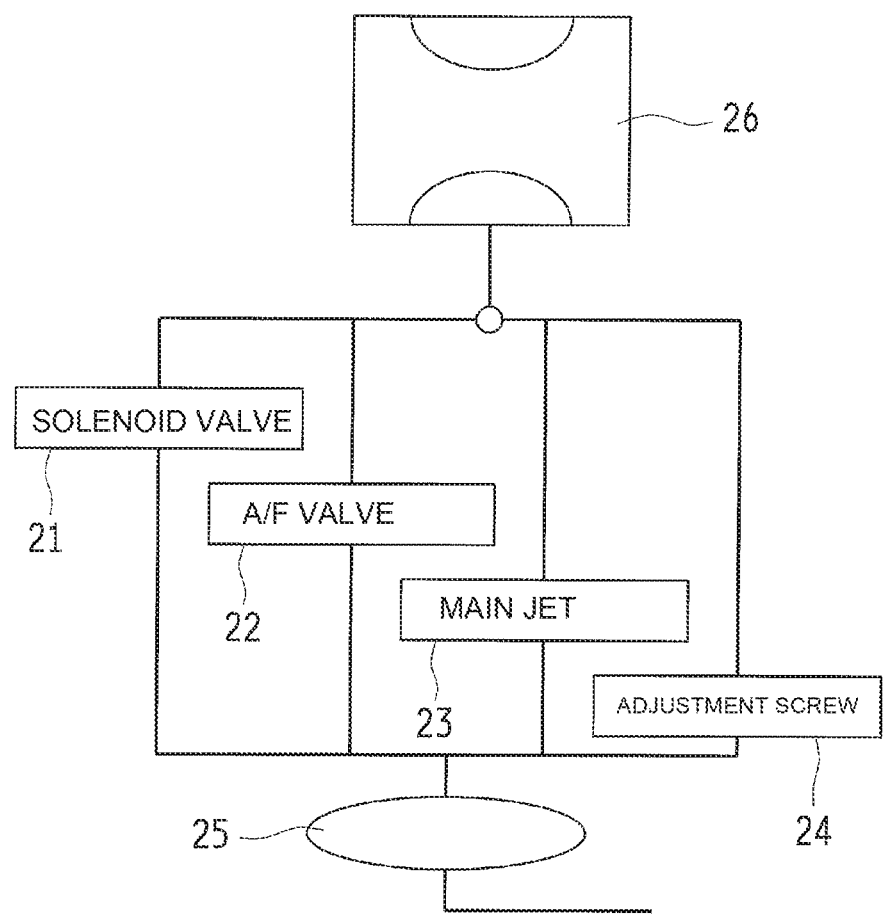
FIG. 2 is a block diagram showing a configuration of a mixing unit for mixing a fuel gas and an intake air of the gas engine shown in FIG. 1.
Figure 3:
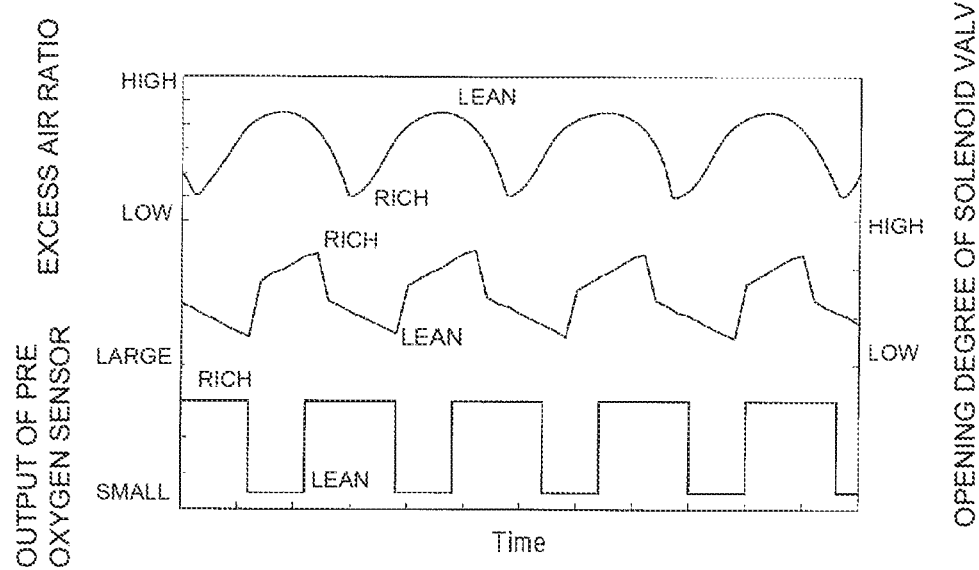
FIG. 3 is a graph showing a time-dependent change of each of an excess air ratio, a solenoid valve opening degree, and a sensor output under a perturbation control.
Figure 4:
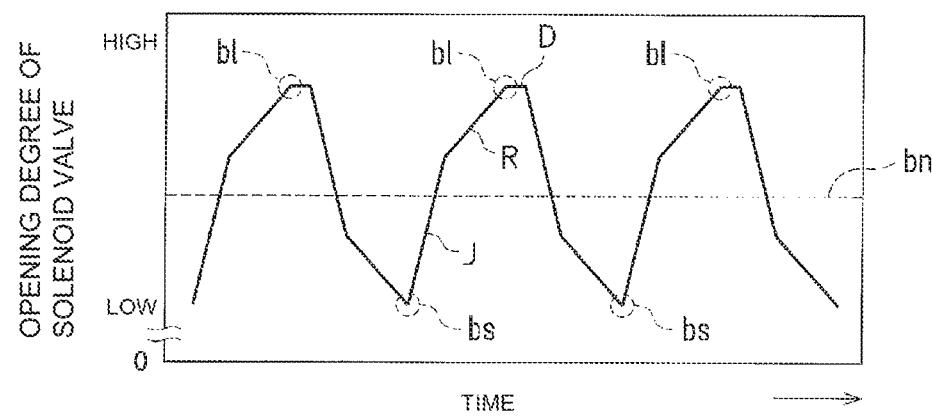
FIG. 4 is a graph for explanation of a method for calculating an average opening degree, which shows details of a time-dependent change of the solenoid valve opening degree under a perturbation control using a solenoid valve.
Figure 5:
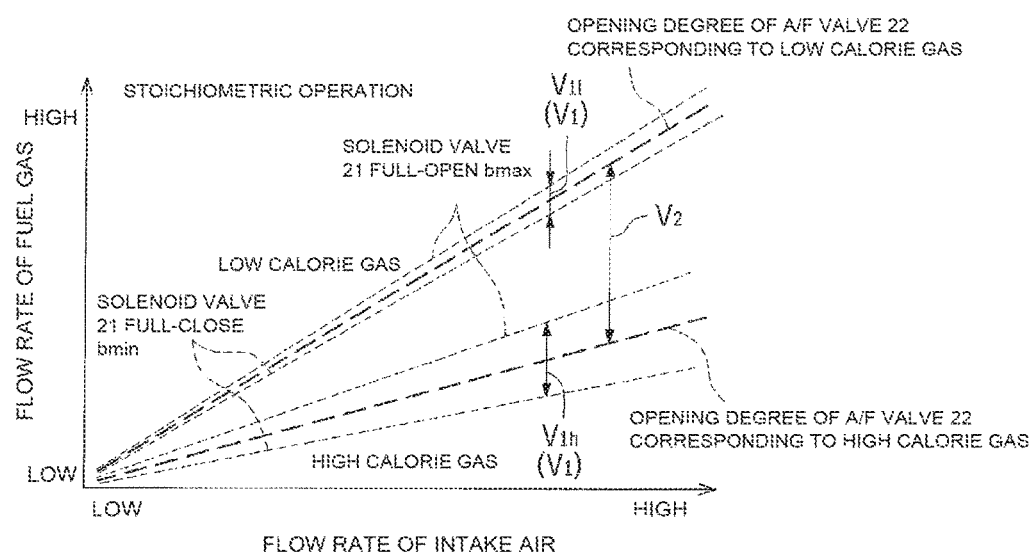
FIG. 5 is a graph showing the relationship between a fuel gas flow rate and an intake air flow rate of a solenoid valve and an A/F valve, which varies depending on a change in the calorific value of a fuel gas.
Figure 6:
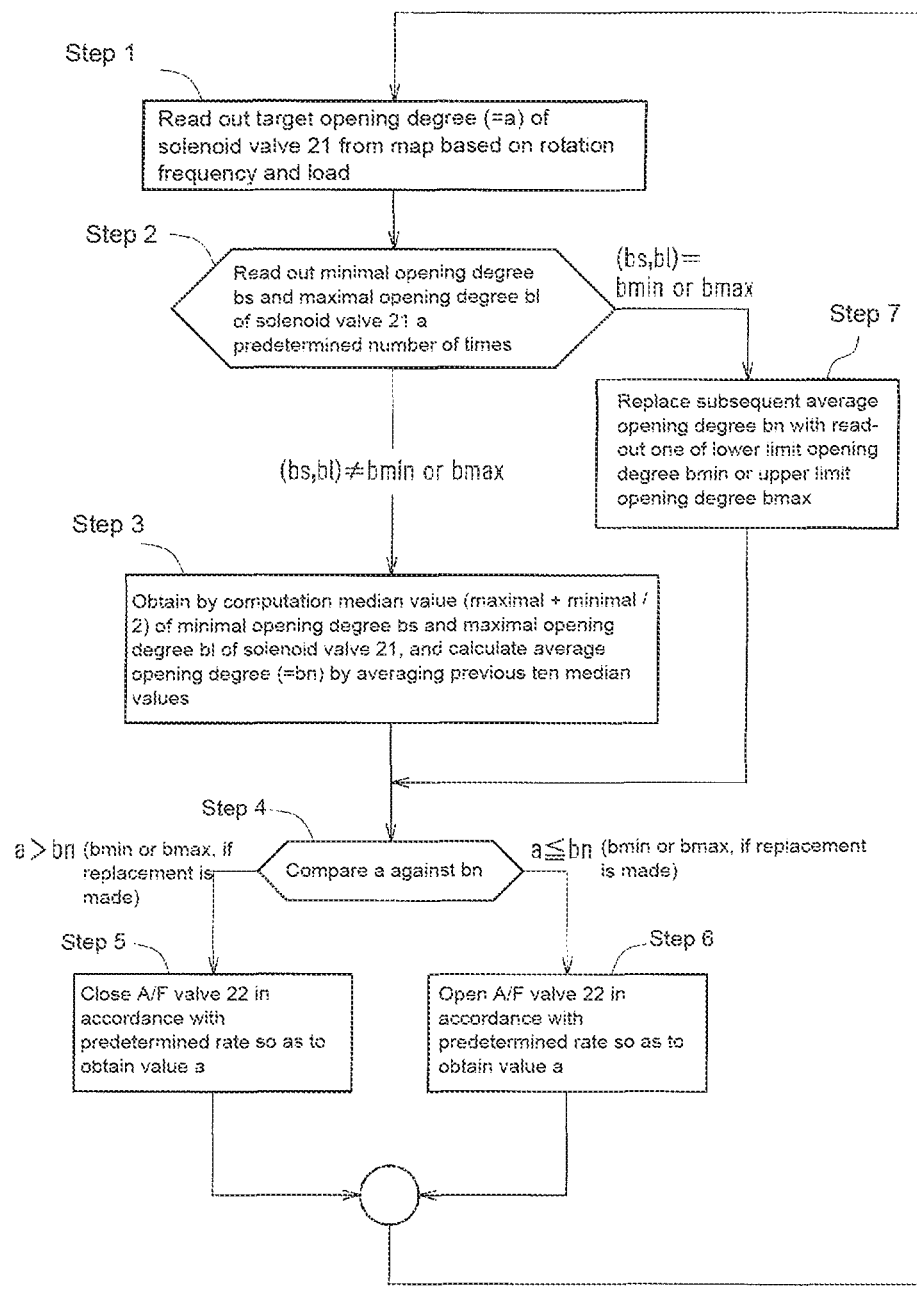
FIG. 6 is a flowchart showing a control performed by a control unit with a change in the calorific value of a fuel gas taken into account.

FIG. 1 schematically shows an entire configuration of a gas engine 1 according to the present invention; FIG. 2 shows a mixing unit 2a for mixing a fuel gas and an intake air of the gas engine 1; FIG. 3 shows a state of a perturbation control performed by a control unit 10 of the gas engine 1; FIG. 4 shows a graph for explanation of a method for calculating an average opening degree bn; FIG. 5 shows a graph for explanation of valve characteristics of a solenoid valve 21 and an A/F valve 22; and FIG. 6 shows a control flow of the control unit 10 with a change in the calorific value of a fuel gas taken into account.

The gas engine 1 includes a solenoid valve 21, an A/F valve 22, and a control unit 10 for performing a perturbation control by the solenoid valve 21 and the A/F valve 22. The control unit 10 being configured to: adjust an opening degree of the A/F valve 22 such that an average opening degree bn of the solenoid valve 21 that is calculated based on a predetermined number of maximal opening degrees bl and a predetermined number of minimal opening degrees bs achieves a target opening degree a in a case where the average opening degree bn is out of the target opening degree a of the solenoid valve 21 which is set in the control unit 10 under the corresponding condition; and upon determining that the maximal opening degree bl or the minimal opening degree bs of the solenoid valve 21 keeps being an upper limit opening degree bmax or a lower limit opening degree bmin over a predetermined number of times, replacing the average opening degree bn with the upper limit opening degree bmax or the lower limit opening degree bmin, for comparison against the target opening degree a.

An entire configuration of the gas engine 1 will firstly be described.

The gas engine 1 includes: a mixing unit 2a for mixing air with a fuel gas, the mixing unit 2a being arranged in an intake path 12 that is connected to a cylinder head 11; and a throttle valve 2b arranged between the mixing unit 2a and the cylinder head 11. The mixing unit 2a and the throttle valve 2b constitute an intake unit 2, and the intake unit 2 is controlled with a signal supplied from the control unit 10.

As shown in FIG. 2, the mixing unit 2a includes a solenoid valve 21, an A/F valve 22, a main jet 23, and an adjustment screw 24, which are connected in parallel between a regulator 25 and a mixer 26.

The solenoid valve 21 is formed of a flow rate characteristics valve designed such that its opening area in which a fuel gas passes through can be adjusted, to control a stoichiometric operation with an excess air ratio ($\lambda=1$) that provides a theoretical air-fuel ratio. The solenoid valve 21 is configured such that a movable valve biased to close a fluid passage with a biasing force of a leaf spring, a spring, or the like, is moved by an electromagnetic coil and opened to a predetermined opening degree. The solenoid valve 21 is, for example, opened and closed at a rate of 25 Hz, and its opening degree can be adjusted by changing the open-close duty cycle. The solenoid valve 21 is not limited to 25 Hz one, but the solenoid valve 21 may be ones of various frequencies adoptable for this type of perturbation control. This configuration enables the solenoid valve 21 to quickly adjust the flow rate with a small flow rate adjustment width $V_1$. The flow rate characteristics valve that forms the solenoid valve 21 may be a proportional control valve.

The A/F valve 22 is formed of a proportional control valve of flow rate characteristics designed such that the opening area of a path in which a fuel gas passes can be adjusted, to control a range from the stoichiometric operation with an excess air ratio ($\lambda=1$) that provides the theoretical air-fuel ratio to a lean operation with an excess air ratio ($\lambda=1.4$ to 1.6) that causes lean combustion. The A/F valve 22 is configured such that the opening degree of a movable valve can be adjusted step-by-step by rotation of a stepping motor. This configuration does not enable the A/F valve 22 to quickly adjust the flow rate, but provides a large flow rate adjustment width $V_2$ such that a width range of excess air ratios can be covered.

The main jet 23 as well as the solenoid valve 21 and the A/F valve 22 is a valve configured to adjust the amount of fuel flowing from the regulator 25 to the mixer 26, and unlike the solenoid valve 21 and the A/F valve 22 described above, its opening degree is fixed according to the number of the main jet 23 used.

The adjustment screw 24 is a valve configured to adjust the amount of fuel gas by manual operation, and normally fixed together with the main jet 23 described above.

The regulator 25 is configured to control the pressure of the fuel gas such that the fuel gas can be always supplied under a constant pressure.

The mixer 26 includes a venturi tube for mix air with the fuel gas. The mixer 26 is configured to mix the fuel gas with air by the venturi effect of air sucked in accordance with the opening degree of the throttle valve 2b which is arranged on the downstream side.

A silencer 3a is arranged in an exhaust path 13 which is connected to the cylinder head 11, and a three-way catalyst 3b is arranged between the silencer 3a and the cylinder head 11. A pre oxygen sensor 31 is arranged on the side of the three-way catalyst 3b where an exhaust gas enters, and another post oxygen sensor 32 is arranged on the side where the exhaust gas exits.

In a case of the lean operation, the mixing unit 2a performs a lean operation in the excess air ratio range ($\lambda=1.4$ to 1.6). At this time, a control of the excess air ratio range ($\lambda=1.4$ to 1.6) is performed by the control unit 10 controlling the A/F valve 22 with the solenoid valve 21 closed, based on a detection result obtained from an entire region sensor (not shown) which is arranged on the side of the three-way catalyst 3b where the exhaust gas enters.

In a case of the stoichiometric operation, the mixing unit 2a performs a perturbation control of the stoichiometric operation in which the air-fuel ratio varies to the lean side and the rich side as centered on the excess air ratio ($\lambda=1$) of the theoretical air-fuel ratio. At this time, the perturbation control is performed by the control unit 10 controlling a variation in the opening degree by, based on a detection result obtained from the pre oxygen sensor 31, opening the A/F valve 22 to an opening degree in the middle of an open-close region, e.g., to an opening degree of 50%, and in this condition, opening the solenoid valve 21 to an opening degree in the middle of an open-close region, e.g., to an opening degree of 50%, and repeatedly opening and closing the solenoid valve 21 at a predetermined pitch from the opening degree of 50%.

Here, in the stoichiometric operation, the solenoid valve 21 and the A/F valve 22 are set to opening degrees in the middle of the open-close regions because a middle opening degree enables a more accurate proportional control as compared to a lower opening degree region or a higher opening degree region. It therefore is not always necessary to adopt the middle opening degree if the accuracy of the proportional control is kept constant over an entire open-close region by performing a correction control, etc. in a lower opening degree region or a higher opening degree region. In a case of the gas engine 1 performing a lean operation, however, it is preferable that an opening degree higher than the middle opening degree is set for the stoichiometric operation in consideration of the fact that the A/F valve 22 is closed at a time of a lean operation. In the following, for convenience of illustration, a description will be given on the assumption that the opening degree of the solenoid valve 21 is 50% and the opening degree of the A/F valve 22 is 50% in a case where the stoichiometric operation is performed by using a fuel gas having a predetermined calorific value.

The control unit 10, in which the relationship is inputted between the opening degrees of the solenoid valve 21 and the A/F valve 22 in respective cases of performing the stoichiometric operation and the lean operation by using a fuel gas having a predetermined calorific value and detection results obtained from the pre oxygen sensor 31, the post oxygen sensor 32, and the entire region sensor (not shown). The control unit 10 is configured to control the stoichiometric operation and the lean operation in accordance with input information.

For example, in a case of controlling the stoichiometric operation, the control unit 10 adjusts the opening degree of the A/F valve 22 while keeping a time average opening degree of the solenoid valve 21 at 50% such that a measurement detection result of the pre oxygen sensor 31 arranged on the entrance side of the three-way catalyst 3b can be the excess air ratio ($\lambda=1$) of the theoretical air-fuel ratio. At this time, if a reference fuel gas is supplied, the opening degree of the A/F valve 22 is also kept at 50%.

The perturbation control of the stoichiometric operation in which the air-fuel ratio varies to the lean side and the rich side as centered on the excess air ratio ($\lambda=1$) of the theoretical air-fuel ratio is performed by controlling the opening-closing degree of the solenoid valve 21 based on measurement detection results obtained from the pre oxygen sensor 31 arranged on the entry side of the three-way catalyst 3b and the post oxygen sensor 32 arranged on the exit side of the three-way catalyst 3b. This perturbation control is performed by the control unit 10 in the following manner.

As shown in FIG. 3, the pre oxygen sensor 31 measures an oxygen concentration of the exhaust gas immediately before flowing into the three-way catalyst 3b. If the pre oxygen sensor 31 is determined to the rich side relative to the stoichiometric operation, the solenoid valve 21 is closed excessively to the lean side relative to the stoichiometric operation setting.

As a result, an excess oxygen in the exhaust gas is occluded in the three-way catalyst 3b, and the three-way catalyst 3b is saturated with occluded oxygen, so that the post oxygen sensor 32 arranged subsequent to the three-way catalyst 3b shifts to the lean side after a predetermined response time from switching of the solenoid valve 21.

Since the solenoid valve 21 is closed to the lean side relative to the stoichiometric operation, the pre oxygen sensor 31 arranged prior to the three-way catalyst 3b is determined to the lean side. In accordance with this determination, the solenoid valve 21 is opened excessively to the rich side relative to the stoichiometric operation setting.

Consequently, oxygen occluded in the three-way catalyst 3b is released to the exhaust gas, to purify the exhaust gas. Oxygen occluded in the three-way catalyst 3b is depleted in due course, so that the post oxygen sensor 32 arranged subsequent to the three-way catalyst 3b shifts to the rich side after a predetermined response time from switching of the solenoid valve 21.

Thereafter, the air-fuel ratio is changed (perturbation) at a predetermined pitch of approximately 1 to 2 sec, so that the post oxygen sensor 32 arranged subsequent to the three-way catalyst 3b has a gentle change in the air-fuel ratio between the lean side and the rich side relative to the excess air ratio ($\lambda=1$) of the theoretical air-fuel ratio. At this time, the three-way catalyst 3b is kept in a catalyst-activated state because oxygen is repeatedly occluded and released.

In the control unit 10, a control map as shown in FIG. 3 is inputted. In a case of performing the stoichiometric operation by using a fuel gas having a predetermined calorific value, the control is performed in accordance with the control map.

As shown in FIG. 4, a control parameter of the valve opening degree of the solenoid valve 21 is determined by a jump-up amount J by which the valve is rapidly opened in a predetermined time, then a rank-up speed R at which the valve is gently opened in a predetermined time, and then a delay time D elapsed before the solenoid valve 21 is rapidly closed. Accordingly, as for the opening degree of the solenoid valve 21 which is inputted in the control unit 10, such an opening degree change condition under the perturbation control is also inputted. In the stoichiometric operation, an opening degree (herein, 50%) of the solenoid valve 21 which corresponds to the oxygen concentration obtained when the pre oxygen sensor 31 has the excess air ratio ($\lambda=1$) of the theoretical air-fuel ratio is recognized as the target opening degree a, and the control unit 10 is configured to control a variation width of the excess air ratio which varies to the lean side and the rich side by varying the opening degree of the solenoid valve 21 to the lean side and the rich side relative to the target opening degree a under the above-mentioned opening degree change condition.

In an actual operation status in which the perturbation is performed by the solenoid valve 21 with predetermined engine rotation frequency and load, the control unit 10 calculates the average opening degree bn in the actual operation status based on a history of the opening degree of the solenoid valve 21 within a certain time period in which the operation status can be considered as stable. As shown in FIG. 4, the calculation of the average opening degree bn is performed by measuring minimal opening degrees bs and maximal opening degrees bl among respective valve opening degrees under the perturbation control in three cycles, the minimal opening degree bs being obtained at a time when the lean side is switched to the rich side, the maximal opening degree bl being obtained at a time when the rich side is switched to the lean side. Although FIG. 4 illustrates the case where the calculation is made by averaging the opening degrees in three cycles, the number of cycles is not particularly limited to three, and the average opening degree bn may be calculated by averaging the opening degrees in one cycle or two cycles, or by averaging the opening degrees in three or more cycles. If the average opening degree bn is calculated based on a history of the opening degrees in one cycle previous to the actual operation status, a status is close to the actual operation status and data processing can be performed quickly, but data stability may be impaired. If the average opening degree bn is calculated based on a history of the opening degrees in three or more cycles previous to the actual operation status, stable data is obtained, but an increased amount of data needs to be processed which makes data processing slow. Therefore, how much previous opening degrees in the history from the actual operation status is used to calculate the average opening degree bn is determined as appropriate in accordance with the used gas engine 1 and environments of usage thereof.

The control unit 10 compares the average opening degree bn in the actual operation status, which is calculated in the above-described manner, against the target opening degree a under the condition inputted to the control unit 10. If the average opening degree bn is lower than the target opening degree a, the opening degree of the A/F valve 22 is reduced to an extent corresponding to the lowness, and if the average opening degree bn is equal to or higher than the target opening degree a, the opening degree of the A/F valve 22 is maintained or opened to an extent corresponding to the highness. Thus, the control is performed such that the average opening degree bn coincides with the target opening degree a.

Here, in the control of making the average opening degree bn coincide with the target opening degree a, if the minimal opening degrees bs or the maximal opening degrees bl of the solenoid valve 21, which are measured for calculating the average opening degree bn, are continuously at a critical level, that is, continuously at the lower limit opening degree bmin obtained when the solenoid valve 21 is fully closed or continuously at the upper limit opening degree bmax obtained when the solenoid valve 21 is fully opened, the control unit 10 determines that the perturbation control with the solenoid valve 21 is not performed and a variation in the calorific value of the fuel gas becomes too large, resulting in the solenoid valve 21 being continuously on the lower limit opening degree bmin side or the upper limit opening degree bmax side. Thus, the opening degree of the A/F valve 22 is controlled until the average opening degree bn is replaced with the lower limit opening degree bmin or the upper limit opening degree bmax. In this manner, a rapid change in the calorific value of the fuel gas which is too rapid to be controlled under the perturbation control can be addressed.

A control performed by the control unit 10 with a change in the calorific value of a fuel gas taken into account will now be described.

In a case where a fuel gas having a predetermined reference calorific value is supplied, the control unit 10 performs the above-described control, but in a case where an actually supplied fuel gas has a calorific value lower than the reference value or in a case where an actually supplied fuel gas has a calorific value higher than the reference value, it is necessary that the A/F valve 22 having a large flow rate adjustment width $V_2$ is opened or closed so that the A/F valve 22 is re-set to an opening degree corresponding to the fuel gas calorific value, as shown in FIG. 5. For example, under a state where the A/F valve 22 is set to an opening degree corresponding to a low calorie gas or to an opening degree corresponding to a high calorie gas, the flow rate adjustment width $V_{1l}$, $V_{1h}$, of the solenoid valve 21 is limited even though the solenoid valve 21 is set to the upper limit opening degree bmax corresponding to full-open or to the lower limit opening degree bmin corresponding to the full-close. It may not be possible that a range from a low calorific value fuel gas to a high calorific value fuel gas is controlled by the solenoid valve 21 alone.

Moreover, in a case where a calorific value of the fuel gas changes during a control of opening and closing the solenoid valve 21 while maintaining the opening degree of the A/F valve 22 by the control unit 10 as in the perturbation control described above, such a change is absorbed into the perturbation control with the solenoid valve 21, and it is difficult to identify whether it is caused by the perturbation control or by the change in the calorific value of the fuel gas. In the actual operation status, therefore, when the calorific value of the fuel gas changes, the solenoid valve 21 capable of quick adjustment of the flow rate follows the change, and falls under control of the solenoid valve 21. As a result, when a change in the air-fuel ratio occurs due to a change in the calorific value of the fuel gas, the perturbation is performed with the solenoid valve 21 shifted in a further opened direction or a further closed direction. Thus, the solenoid valve 21, whose control range is narrow, immediately may come out of a controllable range and become uncontrollable.

Therefore, in order that the opening degree can be adjusted not by the solenoid valve 21 but by the A/F valve 22 when a change in the calorific value of the fuel gas occurs so that the opening degree of the solenoid valve 21 is shifted in a further opened or closed direction, the control unit 10 performs a control as follows.

Firstly, a stoichiometric operation of the gas engine 1 is started with the excess air ratio ($\lambda$=1) of the theoretical air-fuel ratio. The stoichiometric operation is performed by adjusting the opening degree of the A/F valve 22 while keeping the time average value of the opening degree of the solenoid valve 21 at 50%. At this time, when the fuel gas has a predetermined calorific value, the opening degree of the A/F valve 22 is supposed to be an opening degree preset in the control unit 10 which means 50%, as long as the stoichiometric operation is performed at predetermined engine rotation frequency and load. In an actual operation, however, a fuel gas supplied to the gas engine 1 is not always constant, and depending on places, a calorific value of a fuel gas varies during a day.

In this respect, as shown in FIG. 6, to grasp a change in the calorific value of the fuel gas, firstly, predetermined engine rotation frequency and load are detected during a stoichiometric operation, and a target opening degree a of the solenoid valve 21 corresponding to such a condition, which is set in the control unit 10, is read out (step 1).

Then, a predetermined number of minimal opening degrees bs and a predetermined number of maximal opening degrees bl of the current solenoid valve 21 in the actual operation status are read out, and whether to read out a predetermined number of lower limit opening degrees bmin of the solenoid valve 21 or to read out a predetermined number of upper limit opening degrees bmax of the solenoid valve 21 is checked (step 2). At this time, in a case where the perturbation control is normally performed, a minimal opening degree bs and a maximal opening degree bl that are within a control range of the solenoid valve 21 are alternately measured, but in a case where a calorific value of the fuel gas rapidly changes so that the perturbation control does not work, the lower limit opening degree bmin or the upper limit opening degree bmax of the solenoid valve 21 is continuously measured.

If neither the lower limit opening degree bmin nor the upper limit opening degree bmax of the solenoid valve 21 is continuously measured, it is determined that the perturbation control is normally performed, and an average value over a history of opening degrees of the solenoid valve 21 within a certain time period is calculated as the average opening degree bn, the history of opening degrees being a history of opening degrees of the solenoid valve 21 from the read-out of the target opening degree a to the actual operation status. At this time, the minimal opening degrees bs and the maximal opening degrees bl of the solenoid valve 21 in the previous 10 cycles are measured and averaged, to calculate the average opening degree bn (step 3).

In a case where the calorific value of the fuel gas is unchanged, the target opening degree a read out in step 1 is coincident with the average opening degree bn calculated in step 2. Thus, the target opening degree a and the average opening degree bn are compared against each other (step 4).

If the average opening degree bn is lower than the target opening degree a, it means that the calorific value of the fuel gas is high by an amount corresponding to the difference, that is, the solenoid valve 21 is shifting in a closed direction. Thus, the A/F valve 22 is closed in accordance with a predetermined rate (step 5).

If the average opening degree bn is higher than the target opening degree a, it means that the calorific value of the fuel gas is low by an amount corresponding to the difference, that is, the solenoid valve 21 is shifting in an opened direction. Thus, the A/F valve 22 is opened in accordance with a predetermined rate. If the average opening degree bn is equal to the target opening degree a, it means that the calorific value of the fuel gas is unchanged, that is, the solenoid valve 21 is not shifting. Thus, the opening degree of the A/F valve 22 is kept at the current rate (step 6).

If either the lower limit opening degree bmin or the upper limit opening degree bmax of the solenoid valve 21 is continuously measured, it is determined that a rapid change in the calorific value that makes the calorific value of the fuel gas out of the perturbation control is occurring, and the subsequent control is performed by using not the average opening degree bn but either the lower limit opening degree bmin or the upper limit opening degree bmax that has been continuously measured (step 7).

Firstly, the average opening degree bn is replaced with the lower limit opening degree bmin or the upper limit opening degree bmax that has been continuously measured, and compared against the target opening degree a read out in step 1 (step 4).

In a case where the lower limit opening degree bmin replaces, that is, the lower limit opening degree bmin has been continuously measured, it means that the calorific value of the fuel gas rapidly increases to be out of the perturbation control by an amount corresponding to the lowness relative to the target opening degree a. Thus, the A/F valve 22 is closed in accordance with a predetermined rate (step 5).

In a case where the upper limit opening degree bmax replaces, that is, the upper limit opening degree bmax has been continuously measured, it means that the calorific value of the fuel gas rapidly decreases to be out of the perturbation control by an amount corresponding to the highness relative to the target opening degree a. Thus, the A/F valve 22 is opened in accordance with a predetermined rate (step 6).

Thereafter, the control is repeated from step 1.

Accordingly, when a fuel gas having a calorific value lower or higher than the reference fuel gas is supplied, the gas engine 1 can address it by adjusting the opening degree of the A/F valve 22 instead of the solenoid valve 21. Thus, even when the calorific value of the fuel gas largely changes, the change can be addressed, and the perturbation control of the stoichiometric operation with the solenoid valve 21 can be continuously performed. Therefore, exhaust gas purification performance can be maintained for a prolonged time, so that the maintenance interval can be prolonged. In addition, it is not necessary to increase the amount of noble metal in the catalyst or the volume thereof, which can prevent an increase in the costs of catalyst. Moreover, the gas engine 1 can be operated even with use of a fuel gas whose calorific value largely changes. Furthermore, the gas engine 1 can be used in a plurality of countries and regions where fuel gases have different calorific values.

Even in a situation where the calorific value of the fuel gas rapidly increases or decreases to be out of the perturbation control, a state where the perturbation control is enabled can be restored by replacing the average opening degree bn with the lower limit opening degree bmin or the upper limit opening degree bmax and adjusting the opening degree of the A/F valve 22.

As shown in FIG. 5, a gas flow rate adjustment width Vl obtained when the solenoid valve 21 is changed from full-close to full-open with a low calorie gas supplied is largely different from a gas flow rate adjustment width Vh obtained when the solenoid valve 21 is changed from full-close to full-open with a high calorie gas supplied. Performing the perturbation control while changing the opening degree by the same amount, therefore, makes a variation in the air-fuel ratio unsuccessful. Accordingly, in performing the perturbation control of the stoichiometric operation with the solenoid valve 21, it is preferable that when the opening degree of the A/F valve 22 is re-set for a low calorie gas, the opening-closing degree of the solenoid valve 21 has an amount of change in the opening degree with the flow rate adjustment width Vl taken into account, while when the opening degree of the A/F valve 22 is re-set for a high calorie gas, the opening-closing degree of the solenoid valve 21 has an amount of change in the opening degree with the flow rate adjustment width Vh taken into account. In this case, the amount of change in the opening degree of the solenoid valve 21 with the flow rate adjustment width Vl, Vh taken into account can be inputted and set in the control unit 10 in association with the opening degree of the A/F valve 22.

In the embodiment above-described, the target opening degree a is compared against the average opening degree bn, and by an amount corresponding to the difference, the A/F valve 22 is controlled in accordance with the predetermined rate. It however is difficult that the target opening degree a and the average opening degree bn are completely coincident with each other. In the above-described control, therefore, frequent opening and closing of the A/F valve 22 are repeated, which may undesirably increase a burden on the control unit 10. Thus, it may be acceptable that not only each of target opening degrees a mapped in the control unit 10 but also a dead zone width c which corresponds to the target opening degree a is inputted and set in the control unit 10 so that the control may be performed by using the dead zone width c.

The dead zone width c is a value that is set in order to prevent the A/F valve 22 from being frequently opened and closed in response to a difference between the target opening degree a and the average opening degree bn, and is a numerical value range that is set such that the opening degree of the A/F valve 22 is not changed unless the difference exceeds this value. The dead zone width c, therefore, is appropriately set in accordance with the used gas engine 1 and environments of usage thereof.

Figure 7:
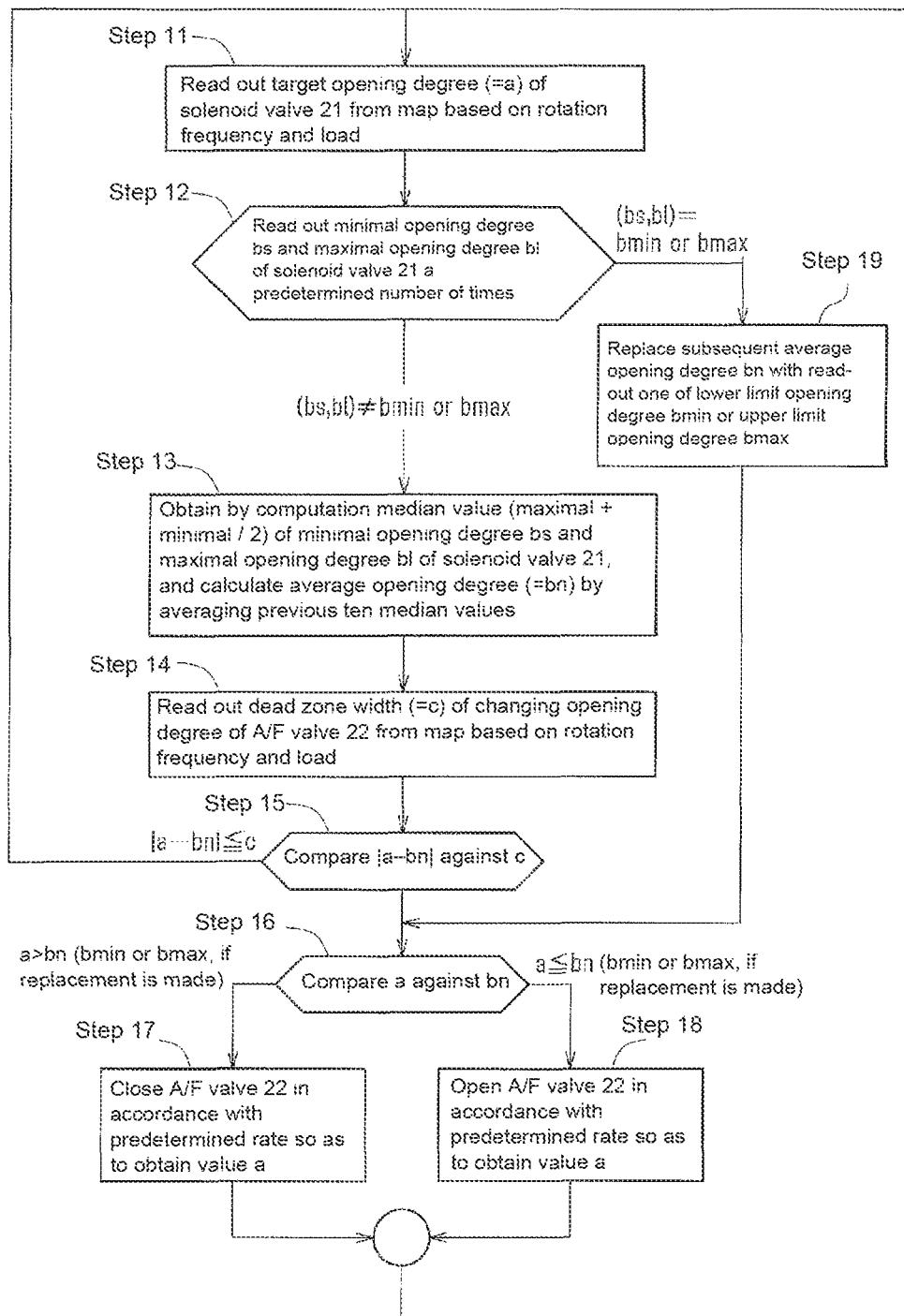
FIG. 7 is a flowchart showing a control performed by a control unit with a change in the calorific value of a fuel gas taken into account, in a gas engine according to another embodiment of the present invention.

FIG. 7 shows a case where the air-fuel ratio of the engine is controlled by using the dead zone width c provided in the control unit 10.

Similarly to step 1 shown in FIG. 6, predetermined engine rotation frequency and load are detected during a stoichiometric operation, and a target opening degree a of the solenoid valve 21 corresponding to such a condition, which is set in the control unit 10, is read out (step 11).

Then, a predetermined number of opening degrees of the current solenoid valve 21 in the actual operation status are read out (step 12).

If neither the lower limit opening degree bmin nor the upper limit opening degree bmax of the solenoid valve 21 is continuously measured, it is determined that the perturbation control is normally performed, and an average value over a history of opening degrees of the solenoid valve 21 within a certain time period is calculated as the average opening degree bn, the history of opening degrees being a history of opening degrees of the solenoid valve 21 from the read-out of the target opening degree a to the actual operation status. At this time, the minimal opening degrees bs and the maximal opening degrees bl of the solenoid valve 21 in the previous 10 cycles are measured and averaged, to calculate the average opening degree bn (step 13).

The dead zone width c within a period in which the engine rotation frequency and load are constant, which is the same as when the target opening degree a is read out, is read out from the control unit 10 (step 14).

When a change in the calorific value of the fuel gas is small, a difference between the target opening degree a read out in step 11 and the average opening degree bn calculated in step 13 is supposed to be smaller than the dead zone width c. Thus, a difference (|a−bn|) between the target opening degree a and the average opening degree bn is compared against the dead zone width c (step 15).

If the difference (|a−bn|) between the target opening degree a and the average opening degree bn is equal to or smaller than the dead zone width c, a change in the calorific value of the fuel gas is within an allowable range, and therefore the control from step 11 is repeated.

If the difference (|a−bn|) between the target opening degree a and the average opening degree bn is greater than the dead zone width c, a change in the calorific value of the fuel gas is beyond the allowable range, and therefore the target opening degree a and the average opening degree bn are compared against each other (step 16).

If the average opening degree bn is lower than the target opening degree a, it means that the calorific value of the fuel gas is high by an amount corresponding to the difference, that is, the solenoid valve 21 is shifting in a closed direction. Thus, the A/F valve 22 is closed in accordance with a predetermined rate (step 17).

If the average opening degree bn is higher than the target opening degree a, it means that the calorific value of the fuel gas is low by an amount corresponding to the difference, that is, the solenoid valve 21 is shifting in an opened direction. Thus, the A/F valve 22 is opened in accordance with a predetermined rate. If the average opening degree bn is equal to the target opening degree a, it means that the calorific value of the fuel gas is unchanged, that is, the solenoid valve 21 is not shifting. Thus, the opening degree of the A/F valve 22 is kept at the current rate (step 18).

If the lower limit opening degree bmin or the upper limit opening degree bmax of the solenoid valve 21 is continuously measured, it is determined that a rapid change in the calorific value that makes the calorific value of the fuel gas out of the perturbation control is occurring, and the subsequent control is performed by using not the average opening degree bn but the lower limit opening degree bmin or the upper limit opening degree bmax (step 19).

Firstly, the average opening degree bn is replaced with the lower limit opening degree bmin or the upper limit opening degree bmax that has been continuously measured, and compared against the target opening degree a read out in step 11 (step 16). At this time, a difference of the lower limit opening degree bmin or the upper limit opening degree bmax from the target opening degree a, which different is caused by replacing the average opening degree bn with the lower limit opening degree bmin or the upper limit opening degree bmax, is considerably greater than the dead zone width c, and therefore any control delay due to the dead zone width c is not caused. Therefore, although the control can be performed through step 15, it is preferable to skip step 15 and go step 16 as shown in FIG. 7 for the purpose of reducing, even a little of, the burden involved in information processing.

In a case where the lower limit opening degree bmin replaces, that is, the lower limit opening degree bmin has been continuously measured, it means that the calorific value of the fuel gas rapidly increases to be out of the perturbation control by an amount corresponding to the lowness relative to the target opening degree a. Thus, the A/F valve 22 is closed in accordance with a predetermined rate (step 17).

In a case where the upper limit opening degree bmax replaces, that is, the upper limit opening degree bmax has been continuously measured, it means that the calorific value of the fuel gas rapidly decreases to be out of the perturbation control by an amount corresponding to the highness relative to the target opening degree a. Thus, the A/F valve 22 is opened in accordance with a predetermined rate (step 18).

Thereafter, the control is repeated from step 11.

Accordingly, when a fuel gas having a calorific value lower or higher than the reference fuel gas is supplied, the gas engine 1 can address it by adjusting the opening degree of the A/F valve 22 instead of the solenoid valve 21. Thus, even when the calorific value of the fuel gas largely changes, the change can be addressed, and the perturbation control of the stoichiometric operation with the solenoid valve 21 can be continuously performed.

In addition, controlling with use of the dead zone width c can prevent the A/F valve 22 from being frequently opened and closed in response to a difference between the target opening degree a and the average opening degree bn, and also can reduce a burden involved in information processing performed by the control unit 10. Thus, for example, accidental occurrence of hunting of the air-fuel ratio can be prevented, and the air-fuel ratio control can be stabilized.

Even though the control is performed with use of the dead zone width c; if the calorific value of the fuel gas rapidly increases or decreased to be out of the perturbation control, the opening degree of the A/F valve 22 can be quickly adjusted to restore a state where the perturbation control is enabled, without the control being slowed in response to the dead zone width c.

Figure 8A:
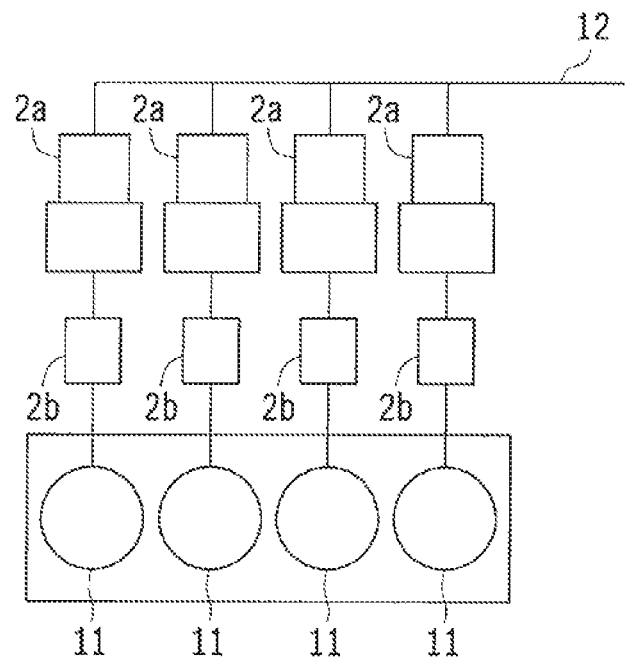
FIG. 8A is a schematic diagram showing another configuration of an intake unit.
Figure 8B:
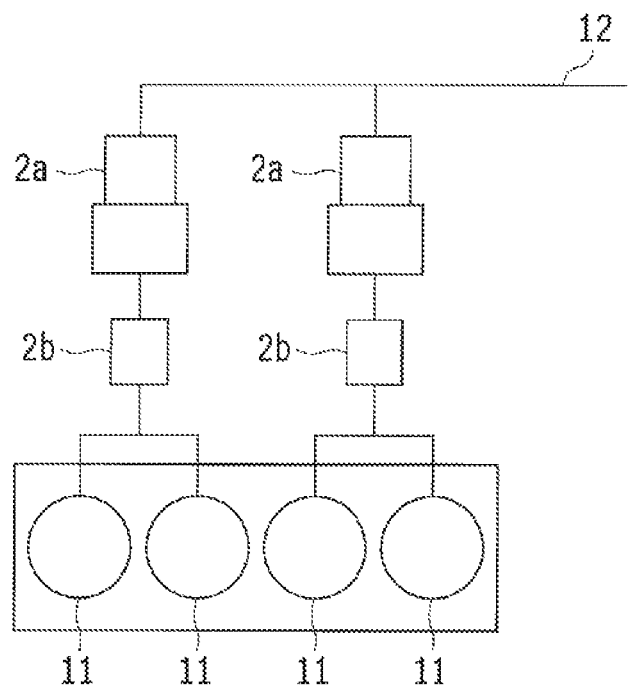
FIG. 8B is a schematic diagram showing still another configuration thereof.

In this embodiment, one mixing unit 2a is provided in the intake path 12, but one mixing unit 2a may be provided in each cylinder head 11 of the gas engine 1 as shown in FIG. 8A, or one mixing unit 2a may be provided in every two or more (in the drawing, two) cylinder heads 11 as shown in FIG. 8B.

Figure 9:
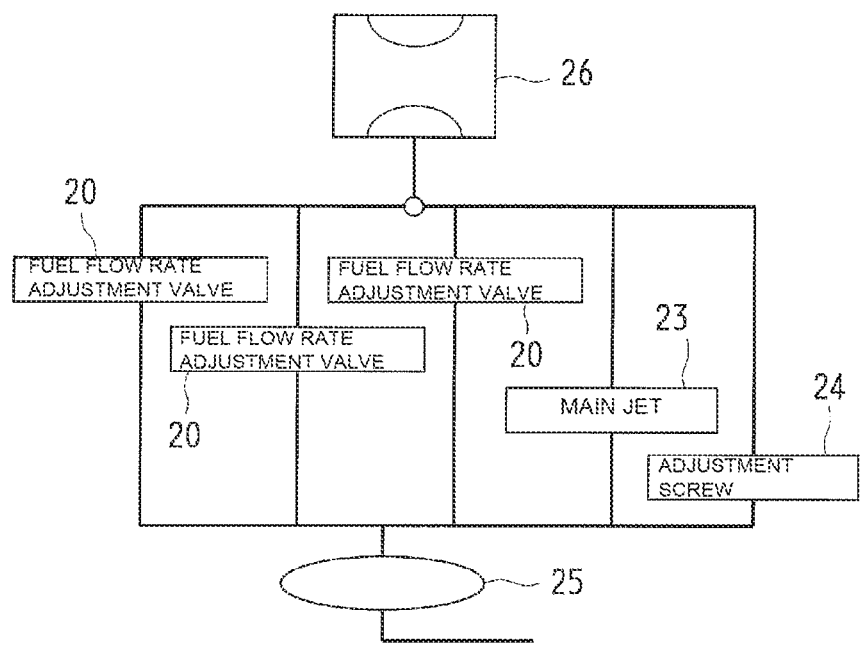
FIG. 9 is a schematic diagram showing another configuration of the mixing unit.

In this embodiment, the mixing unit 2a is configured to control the solenoid valve 21 and the A/F valve 22 having different flow rate characteristics, it may be acceptable that two, three, or more (in drawing, three) fuel flow rate adjustment valves 20 having the same flow rate characteristics are provided and the mixing unit 2a is configured to control them as shown in FIG. 9. In such a configuration, a fuel flow rate adjustment valve 20 that works similarly to the solenoid valve 21 of this embodiment and a fuel flow rate adjustment valve 20 that works similarly to the A/F valve 22 may be provided; or alternatively each of the fuel flow rate adjustment valves 20 may be configured to work similarly to the solenoid valve 21 of this embodiment and the A/F valve 22 may be configured to work similarly. In this case, various valves usable for this type of fuel gas control, as typified by butterfly valves and solenoid valves, are adoptable as the fuel flow rate adjustment valve 20.

In the above-described configuration, the gas engine 1 is able to switch between the stoichiometric operation and the lean operation, but the gas engine 1 may be configured to perform only the stoichiometric operation. Although the gas engine 1 is configured such that the excess air ratio in the stoichiometric operation is detected by the pre oxygen sensor 31, it may be acceptable to use an entire region sensor (not shown) instead of the pre oxygen sensor 31 to detect the excess air ratio in the stoichiometric operation.

Each of the above-described gas engines 1 having such a configuration can be suitably used as a drive source of a gas heat pump apparatus (not shown). The gas engine 1 can also be suitably used as a drive source of a cogeneration apparatus (not shown).

Although this embodiment describes the gas engine 1, it may be applicable not only to the gas engine 1 but also to various engines in which a perturbation control is performed.

It should be noted that the present invention may be embodied in many different forms without departing from the spirit or essential characteristics thereof. The above-described embodiments are therefore to be considered in all respects only as illustrative and not restrictive. The scope of the present invention is defined by the claims, and never bound by the description. All modifications and changes which come within the scope of the claims are to be embraced by the present invention.

REFERENCE SIGNS LIST 1 gas engine
10 control unit (control means)
13 exhaust path
2 intake unit
21 solenoid valve (first valve)
22. A/F valve (second valve)
3b three-way catalyst (exhaust gas purification catalyst)
31 pre oxygen sensor (air-fuel ratio detection sensor)
32 post oxygen sensor
a target opening degree
bn average opening degree
bs minimal opening degree
bl maximal opening degree
borax upper limit opening degree
bmin lower limit opening degree

The invention claimed is:

1. A gas engine comprising:
a first valve and a second valve arranged in a fuel path, the second valve having a longer control period than the first valve does;
an exhaust gas purification catalyst arranged in an exhaust path;
an air-fuel ratio detection sensor arranged on an entrance side of the exhaust gas purification catalyst; and
control means for issuing a drive signal to the first valve and the second valve, the control means being configured to:
issue to the second valve a drive signal for setting an opening degree to a predetermined opening degree, and issue to the first valve a drive signal for setting an opening degree to a fuel rich side or a fuel lean side based on a detection signal of the air-fuel ratio detection sensor,
recognize an opening degree at a time of switching from the fuel rich side to the fuel lean side as a maximal opening degree and an opening degree at a time of switching from the fuel lean side to the fuel rich side as a minimal opening degree, and calculate an average opening degree based on a predetermined number of the maximal opening degrees and a predetermined number of the minimal opening degrees,
when the average opening degree is lower than a target opening degree that is preset based on an engine rotation frequency and output, issue to the second valve a drive signal for closing at a predetermined rate, and when the average opening degree is equal to or higher than the target opening degree, issue a drive signal for opening at a predetermined rate,
detect a current opening degree of the first valve; and
when a determination is made by the control means that the current opening degree keeps being an upper limit opening degree or a lower limit opening degree of the first valve over a predetermined number of times, replace the average opening degree with the upper limit opening degree or the lower limit opening degree, for comparison against the target opening degree, without calculating the average opening degree based on a predetermined number of the maximal opening degrees and a predetermined number of the minimal opening degrees.

2. The gas engine according to claim 1, wherein
the control means is configured to adjust an opening degree of the first valve such that an average opening degree is settled to a target opening degree having a width in a case where the average opening degree is not replaced with the upper limit opening degree or the lower limit opening degree.

3. The gas engine according to claim 1, wherein
the first valve and the second valve are provided for each cylinder head or for every plurality of cylinder heads.

4. The gas engine according to claim 1, wherein
a plurality of the first valve and the second valve are provided.

5. The gas engine according to claim 1, wherein
the control means is configured to set an opening degree of the first valve and an opening degree of the second valve based on an air-fuel ratio measured by an oxygen sensor or an entire region sensor that is arranged in the exhaust path of the gas engine at a location upstream of the exhaust gas purification catalyst.

6. The gas engine according to claim 2, wherein the first valve and the second valve are provided for each cylinder head or for every plurality of cylinder heads.

7. The gas engine according to claim 2, wherein a plurality of the first valve and the second valve are provided.

8. The gas engine according to claim 2, wherein the control means is configured to set an opening degree of the first valve and an opening degree of the second valve based on an air-fuel ratio measured by an oxygen sensor or an entire region sensor that is arranged in the exhaust path of the gas engine at a location upstream of the exhaust gas purification catalyst.

9. The gas engine according to claim 1, wherein a plurality of the first valve is provided.

10. The gas engine according to claim 1, wherein a plurality of the second valve is provided.

11. The gas engine according to claim 2, wherein a plurality of the first valve is provided.

12. The gas engine according to claim 2, wherein a plurality of the second valve is provided.

* * * * *